United States Patent
Vatanparast et al.

(10) Patent No.: US 7,822,446 B2
(45) Date of Patent: Oct. 26, 2010

(54) PORTABLE ELECTRONIC DEVICE WITH COMPLIANT SLIDING HINGE

(75) Inventors: Ramin Vatanparast, Redwood City, CA (US); Liangfeng Xu, Coppell, TX (US)

(73) Assignee: Nokia Corporation, Espoo (FI)

( * ) Notice: Subject to any disclaimer, the term of this patent is extended or adjusted under 35 U.S.C. 154(b) by 781 days.

(21) Appl. No.: 11/704,849

(22) Filed: Feb. 9, 2007

(65) Prior Publication Data
US 2008/0194120 A1   Aug. 14, 2008

(51) Int. Cl.
*H04M 1/00*   (2006.01)

(52) U.S. Cl. .............. 455/575.4; 455/575.1; 361/814; D14/138 AD

(58) Field of Classification Search .............. 455/575.4, 455/575.1; D14/138 AD; 361/814, 679.39, 361/679.55, 679.56
See application file for complete search history.

(56) References Cited

U.S. PATENT DOCUMENTS

| | | | |
|---|---|---|---|
| 6,233,469 B1 * | 5/2001 | Watanabe | 455/575.1 |
| 7,082,318 B2 * | 7/2006 | Wilson | 455/550.1 |
| 7,532,916 B2 * | 5/2009 | Lee et al. | 455/575.4 |
| 2002/0137476 A1 * | 9/2002 | Shin | 455/90 |
| 2004/0198247 A1 * | 10/2004 | Jokinen et al. | 455/90.1 |
| 2004/0262179 A1 * | 12/2004 | Gartrell et al. | 206/320 |
| 2005/0054395 A1 * | 3/2005 | Arbisi et al. | 455/575.3 |
| 2005/0059438 A1 * | 3/2005 | Jellicoe | 455/575.1 |
| 2005/0113154 A1 * | 5/2005 | Park et al. | 455/575.4 |
| 2006/0133052 A1 * | 6/2006 | Harmon et al. | 361/752 |

FOREIGN PATENT DOCUMENTS

EP   0 454 297 A2   10/1991
WO   WO 2006006776 A1 *   1/2006

OTHER PUBLICATIONS

"Nokia 6265i Phone Features" brochure, 1 page.
"Nokia 2652 Preisinformation" brochure, 1 page.

* cited by examiner

*Primary Examiner*—Lewis G West
*Assistant Examiner*—Dung Hong
(74) *Attorney, Agent, or Firm*—Herrington & Smith

(57) ABSTRACT

A portable electronic device including electronic circuitry; and a housing having the electronic circuitry mounted therein. The housing includes a first housing section movably connected to a second housing section by a compliant hinge arrangement. The compliant hinge arrangement includes at least one living hinge. The first and second sections are adapted to longitudinally slide relative to each other.

19 Claims, 6 Drawing Sheets

PORTABLE ELECTRONIC DEVICE WITH COMPLIANT SLIDING HINGE

BACKGROUND OF THE INVENTION

1. Field of the Invention

The invention relates to a portable electronic device and, more particularly, to a compliant hinge arrangement between slidable sections of the portable electronic device.

2. Brief Description of Prior Developments

Compliant hinges can be found in several plastic products, such as a living hinge on a cap of a shampoo bottle for example. Some compliant switch sliding has been used in Micro-Electro-Mechanical Systems (MEMS) devices in the past such as shown in FIG. 1. MEMS is the integration of mechanical elements, sensors, actuators, and electronics on a common silicon substrate through micro-fabrication technology. A compliant hinge has been used in a flip-type mobile telephone such as the NOKIA model number 2652 phone where one housing section rotates relative to another housing section between a folded position and an unfolded position. Slide-type mobile telephones are also known such as the NOKIA model number 6265 phone for example.

The competition in mobile phone markets becomes tougher every year; especially in the low-end segment where the profit margin is low. In order to increase profits for a manufacturer, the only way is to lower the bill of materials. This means that the devices must be made cheaper and with lesser parts, but still have the same functionalities. Thus, there is a need to manufacture portable electronic devices, such as slide-type mobile telephones for example, with lesser parts than in conventional devices. There is also a need to provide an assembly which is simple because there are no parts on a sliding mechanism. There is also a need to provide a bill of material for manufacturing a slide phone which is expected to be less than in a conventional sliding phone.

SUMMARY OF THE INVENTION

In accordance with one aspect of the invention, a portable electronic device is provided including electronic circuitry; and a housing having the electronic circuitry mounted therein. The housing includes a first housing section movably connected to a second housing section by a compliant hinge arrangement. The compliant hinge arrangement includes at least one living hinge. The first and second sections are adapted to longitudinally slide relative to each other.

In accordance with another aspect of the invention, a hand-held portable electronic device is provided comprising electronic circuitry; and a housing having the electronic circuitry mounted therein. The housing comprises a first housing section slidably connected to a second housing section between a closed or collapsed position and an open or extended position. The housing comprises a one piece housing member having a lower section forming a portion of the first housing section and an upper section forming a portion of the second housing section. The upper and lower sections are adapted to move relative to each other between the collapsed position and the extended position without rotational movement therebetween.

In accordance with another aspect of the invention, a method of manufacturing a hand-held portable electronic device is provided comprising providing a first section longitudinally slidably connected to a second section, wherein the first and second sections comprise electronic components of electronic circuitry of the hand-held portable electronic device; and providing a compliant hinge arrangement between portions of the first and second sections. The compliant hinge arrangement comprises at least one living hinge. The at least one living hinge bends when the first section longitudinally slides relative to the second section.

In accordance with another aspect of the invention, a method of manufacturing a hand-held portable electronic device is provided comprising forming a housing member with an upper section connected to a lower section by a compliant hinge arrangement comprising at least one living hinge; forming a first section of the hand-held portable electronic device having electronic components of electronic circuitry therein; forming a second section of the hand-held portable electronic device having electronic components of the electronic circuitry therein; and longitudinally slidably connecting the first and second sections to each other, wherein the lower section of the housing member forms a portion of the first section and the upper section of the housing member forms a portion of the second section.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
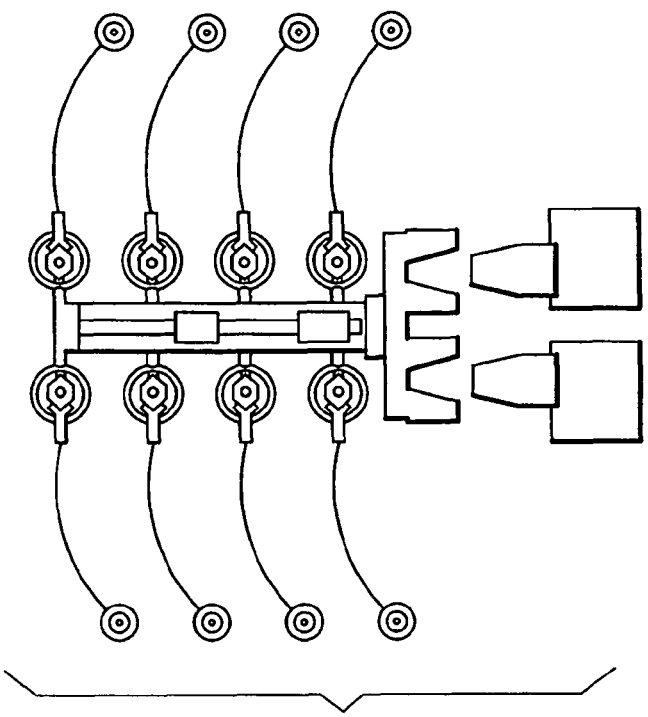
FIG. 1 is a plan view of a conventional Micro-Electro-Mechanical Systems (MEMS) device having a compliant sliding switch.
Figure 2:
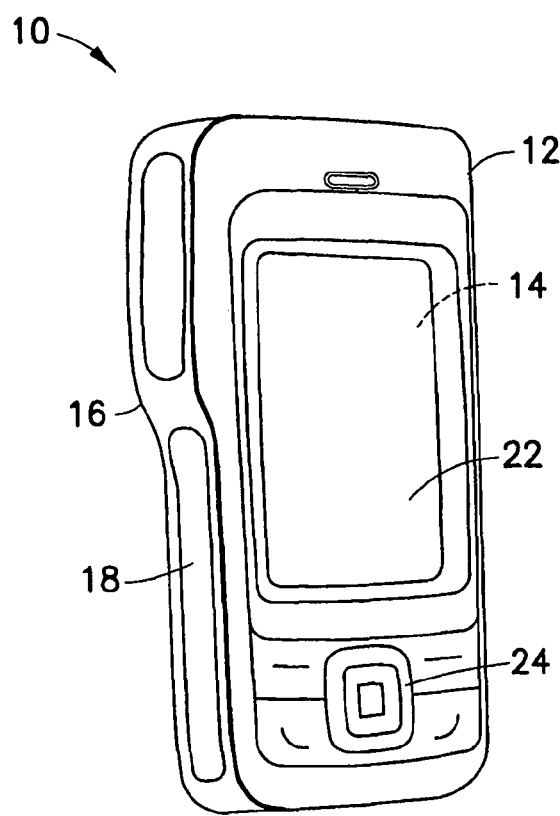
FIG. 2 is a perspective view of a portable electronic device comprising features of the invention in a closed or collapsed position.

Referring to FIG. 2, there is shown a perspective view of a hand-held portable electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

In this embodiment the device 10 comprises a mobile telephone. However, in alternate embodiments the device could comprise any suitable type of hand-held portable electronic device such as a gaming device, a PDA, etc. In addition, as in known in the art, the telephone 10 can include other features or applications such as a camera, a music player, a game player, an Internet browser, etc. The telephone 10 generally comprises a housing 12 and electronic circuitry 14. The electronic circuitry 14 includes, for example, a transceiver, a controller such as a microprocessor, a memory, etc. The housing 12 includes a first housing section 16 and a second housing section 18. In alternate embodiments more than two housing sections could be provided.

Figure 3:
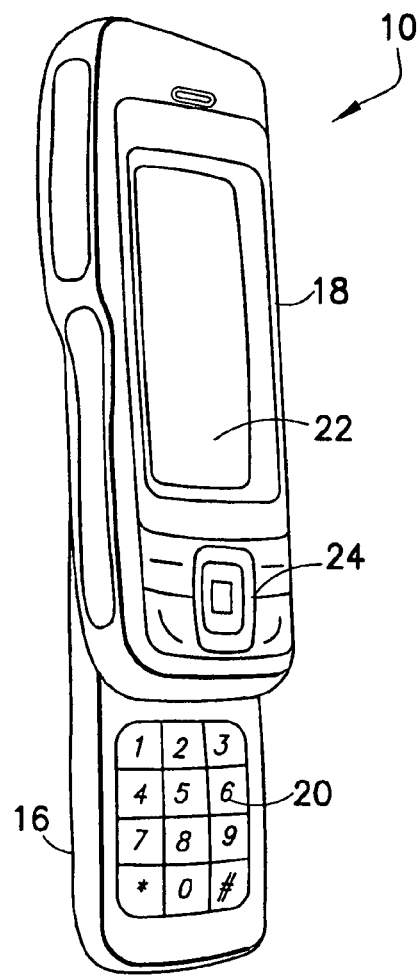
FIG. 3 is a perspective view of the device shown in FIG. 2 is an open or expanded position.

In this embodiment the telephone 10 is a slide phone wherein the first and second housing sections 16, 18 are slidable relative to each other between a collapsed position as shown in FIG. 2 and an extended position as shown in FIG. 3. The first housing section 16 generally comprises a keypad section 20 (see FIG. 3) of the electronic circuitry. The keypad section 20 is covered by the second section 18 when the telephone is in its collapsed position as seen in FIG. 2. The second housing section 18 generally comprises a display 22 and a user interface control section 24 of the electronic circuitry. The user interface control section 24 can comprise, for example, soft keys and a joystick or touch pad. In a preferred embodiment the first section 16 is spring loaded relative to the second section 18 towards the extended position shown in FIG. 3, and the telephone has a latch system to retain the housing sections at the collapsed position shown in FIG. 2.

Figure 4:
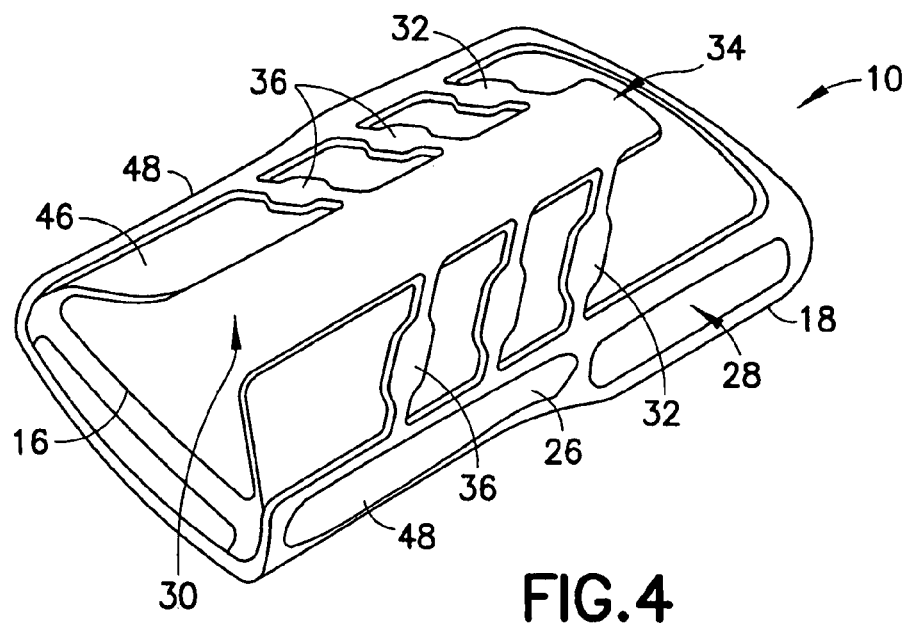
FIG. 4 is a perspective view of a rear side of the device as shown in FIG. 2.
Figure 5:
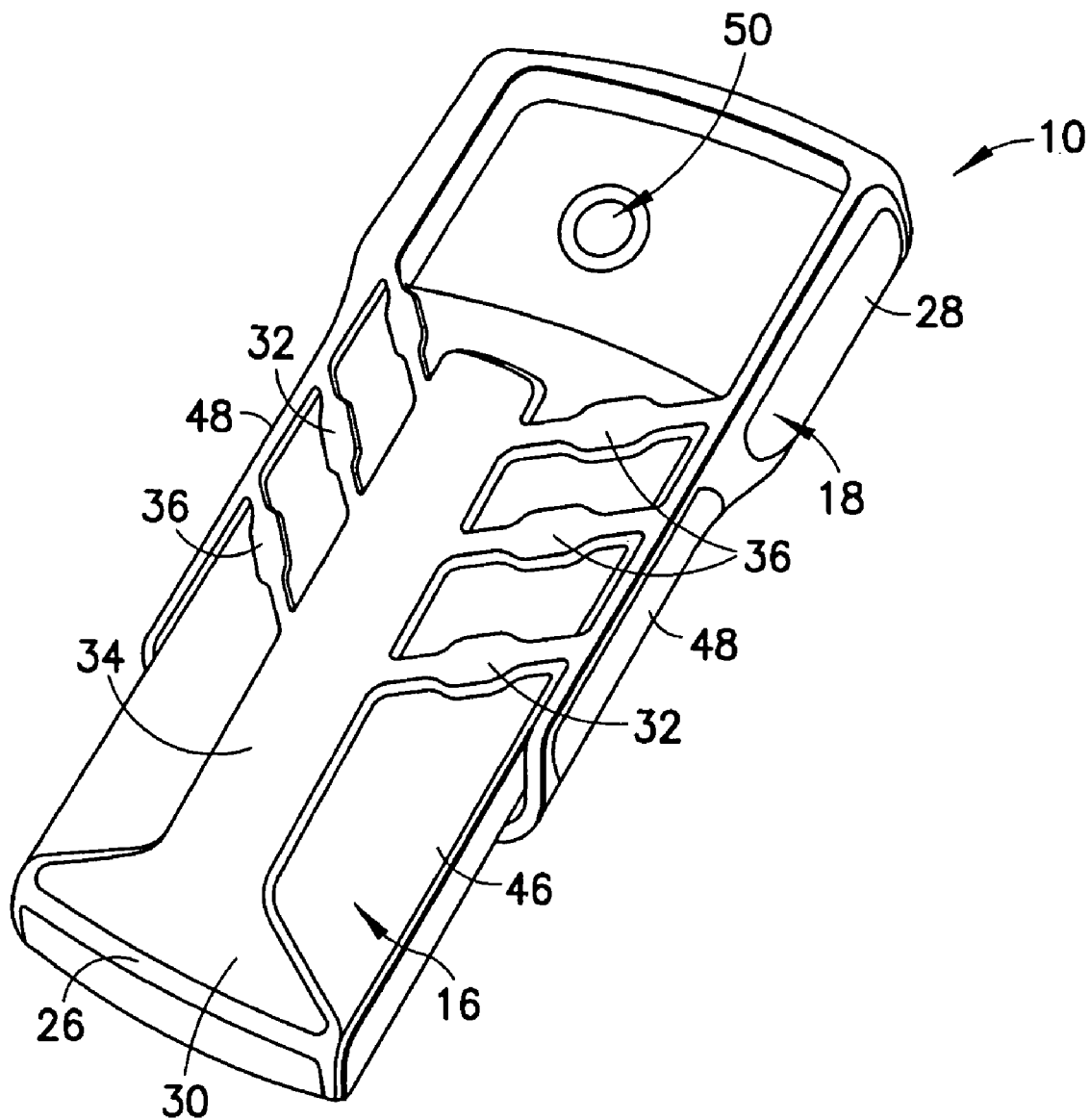
FIG. 5 is a perspective view of a rear side of the device as shown in FIG. 3.

Referring also to FIGS. 4 and 5, perspective views of the rear of the telephone 10 are shown in the collapsed position and the extended position, respectively. The housing 12 comprises a housing member 26 which forms portions of the first and second housing sections 16, 18. In this embodiment the housing member 26 comprises a one-piece molded polymer member. However, in alternate embodiments the housing member 26 could be comprised of multiple members and/or a plurality of different materials, such as a first material overmolded onto a second material for example.

In this embodiment the housing member 26 comprises an upper section 28, a lower section 30, and a compliant hinge arrangement 32 connected between the upper and lower sections. The upper section 28 forms a portion of the second housing section 18 including portions of its front wall, lateral side walls and top end. The lower section 30 forms a portion of the first housing section 16 including a portion of its rear wall and its bottom end. The compliant hinge arrangement 32 connects the upper and lower sections 28, 30 to each other.

The compliant hinge arrangement 32, in this embodiment, has six beams 36 which extend from a middle portion 34 of the lower section 30 to the lateral side walls 48 of the upper section 28. The six beams 36 are grouped into two sets of three beams each; one set on each opposite lateral side of the middle portion 34. However, in alternate embodiments more or less than six beams or two sets could be provided. In addition, other shapes and sizes of compliant hinge arrangements could be provided. In this embodiment the beams 36 are identical to each other, with the exception that the beams on the right side of the middle portion 34 are mirror image reverse angled relative to the beams on the left side of the middle section. However, in alternate embodiments, one or more of the beams could be different from the other beams. As seen in comparing FIG. 4 to FIG. 5, the beams 36 are angled outwardly downward when the telephone is in the collapsed position (FIG. 4) and are angled outwardly upward when the telephone is in the expanded position (FIG. 5).

Figure 6:
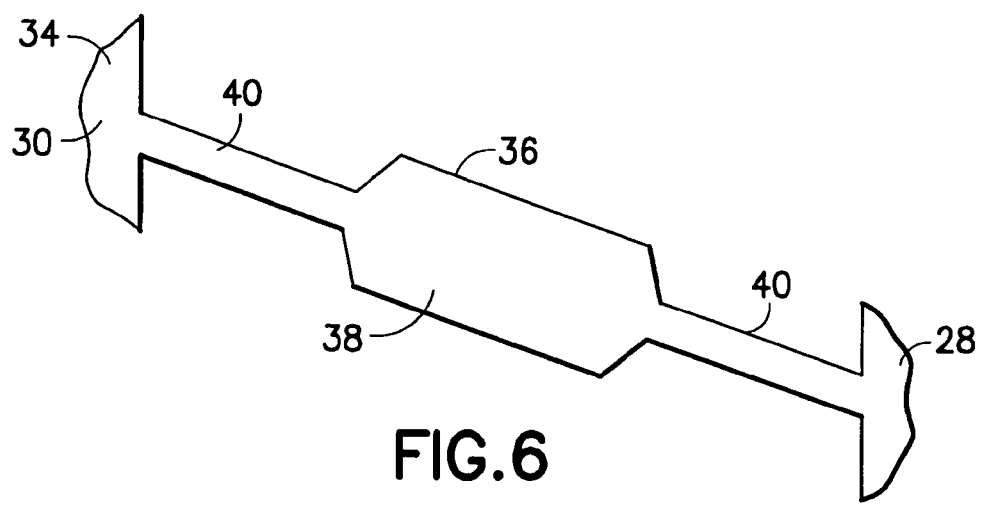
FIG. 6 is an enlarged view of one of the beams of the compliant hinge arrangement of the housing member shown in FIGS. 4-5.

Referring also to FIG. 6, each beam 36 generally comprises a stiffened section 38 and two living hinge sections 40. In alternate embodiments one or more of the beams could have a uniform stiffness along its length. Thus, the beam could comprise merely one living hinge section, or could comprise more than two living hinge sections. As seen in FIG. 6, the beams 36 have a general straight shape when the telephone is in the collapsed or expanded positions.

Figure 7:
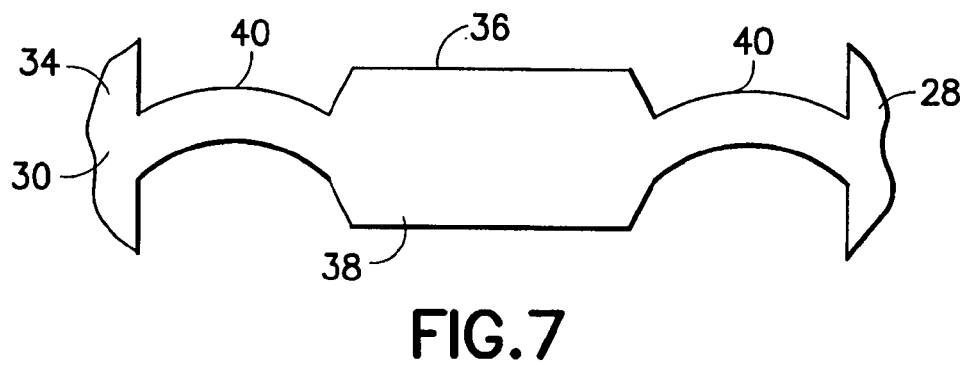
FIG. 7 is a view of the beam shown in FIG. 6 when the upper and lower sections of the housing member are moved partially between the collapsed and expanded positions shown in FIGS. 4-5.

When a user opens the telephone from the collapsed position shown in FIG. 4 towards the expanded position shown in FIG. 5, the first housing section 16 longitudinally slides down relative to the second housing section 18. Referring also to FIG. 7, as this occurs, the beams 36 of the compliant hinge assembly are able to deform with the two living hinge sections 40 of each beam bending. The stiffened section 38 rotates relative to the first and second housing sections 16, 18, but the first and second housing sections 16, 18 do not rotate relative to each other; they merely translationally slide relative to each other. When a user closes the telephone from the expanded position shown in FIG. 5 towards the collapsed position shown in FIG. 4, the first housing section 16 longitudinally slides up into the second housing section 18; the beams deforming in a reverse fashion.

Figure 8:
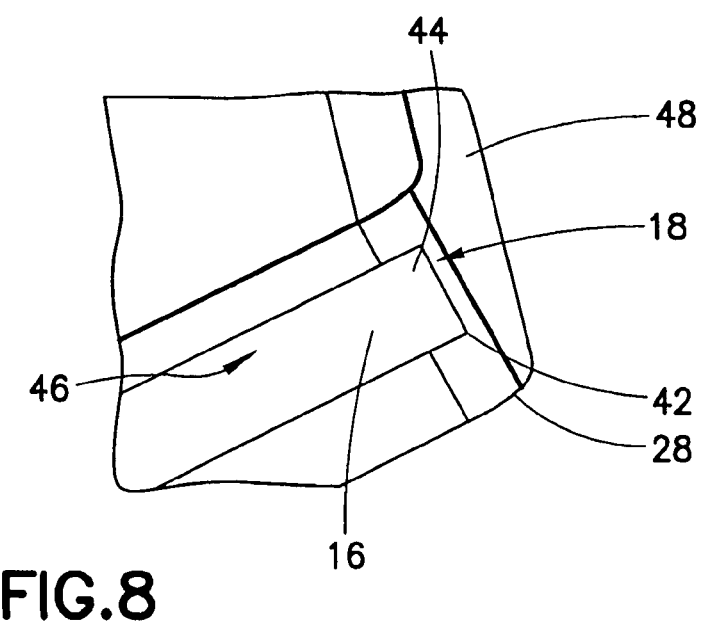
FIG. 8 is an enlarged view illustrating a sliding rail arrangement between the first and second sections of the device shown in FIGS. 2-5.

The embodiment described above illustrates use of the invention integrated into the outer cover of a telephone. The invention could additionally or alternatively be integrated into an inner cover of a telephone; so it would not be seen by a user. Referring also to FIG. 8, portions of the first and second housing sections 16, 18 preferably form a sliding rail system for maintaining alignment of the upper and lower sections 28, 30 relative to each other. In the example shown in FIG. 8, the inner surface of the lateral side walls 48 of the upper section 28 have longitudinal grooves 42, and a second housing member 46 of the first housing section 16 has rails 44 that slide in the grooves 42 as the telephone is moved between the collapsed and expanded positions. In the embodiment shown, the rails and grooves are integrally formed with the housing members. Thus, the shape of the housing members merely form the rails and grooves; not extra parts attached to the housing members. However, in an alternate embodiment, one or more of the rails and/or grooves could be provided by attaching another member(s) to the housing member(s).

In one type of alternate embodiment, the beams 36 could have a curved shape when the housing is in the open or closed positions. Another alternate shape could comprise a serpentine shape, or any other suitable shape of beam; perhaps even a beam with multiple arms or segments. In the embodiment shown, when the first housing section 16 is moved to its open position as shown in FIG. 5, a camera 50 is uncovered. However, in an alternate embodiment a camera might not be uncovered. As noted above, in alternate embodiments the housing member 26 could be comprised of multiple members and/or a plurality of different materials, such as a first material overmolded onto a second material for example. For example, the housing member 26 could comprise a skeleton made of a superelastic shape-memory alloy material, such as NITINOL for example, with an overmolded covering of a polymer material. Alternatively, the beams 36 could comprise merely a superelastic shape-memory alloy material with the upper and lower sections 28, 30 overmolded onto ends of the beams.

This invention provides a novel compliant hinge mechanism of a slide phone integrated on a device cover. The invention integrates essential feature of a sliding phone by a set of compliant sliding mechanisms integrated on inner covers and/or outer covers. The arrangement 36 has been described as a compliant "hinge" arrangement, but it should be understood that any suitable repeatably deformable or reconfigurable connection between longitudinally slidable upper and lower sections of a one-piece housing member is intended to be included in this description.

The one-piece housing member can be made of any suitable material, such as Polypropylene or Thermoplastic Polyurethane (TPU) for example. For polypropylene, properties include excellent low temperature properties; poor high temperature properties; excellent properties for living hinges; good fatigue properties; well tested in compliant mechanisms and Sy/E ratio of 0.025 (good indicator of use in compliant mechanisms). For TPU, properties include excellent low temperature properties; excellent high temperature properties; excellent properties for living hinges; good fatigue properties; Sy/E ratio of 0.8 (good indicator of use in compliant mechanisms).

The structure of the housing member 26 can be built in different ways, from different material(s), such as modelling the total cover area, including the compliant mechanism. As a result, there will be only one molded part which acts as the cover and also provides an integral sliding mechanism. There are lesser parts than in conventional sliding devices. Assembly is simple because there are no parts on the sliding mechanism to be assembled. The bill of materials is expected to be less than in a conventional sliding phone. The flexible covers decrease impact forces in accidental drops. The device with such a mechanism also has all the advantages of any device with sliding mechanism.

Figure 9:
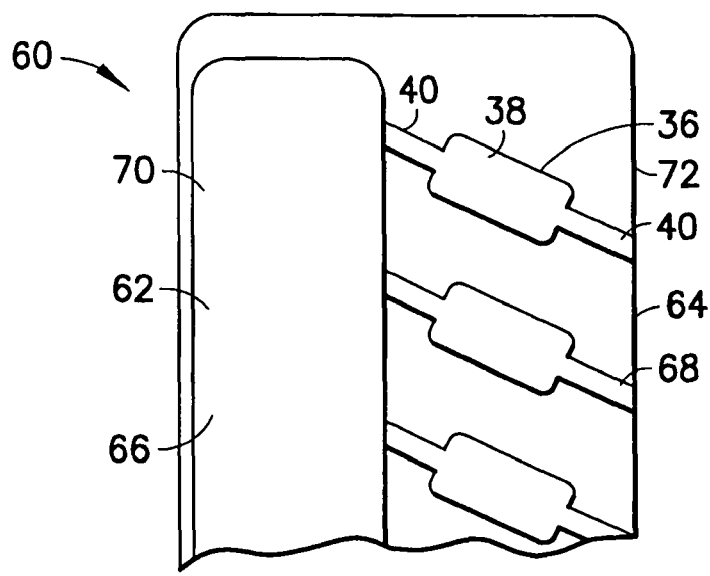
FIG. 9 is a partial rear side view of an alternate embodiment of the invention with the device in a closed position.
Figure 10:
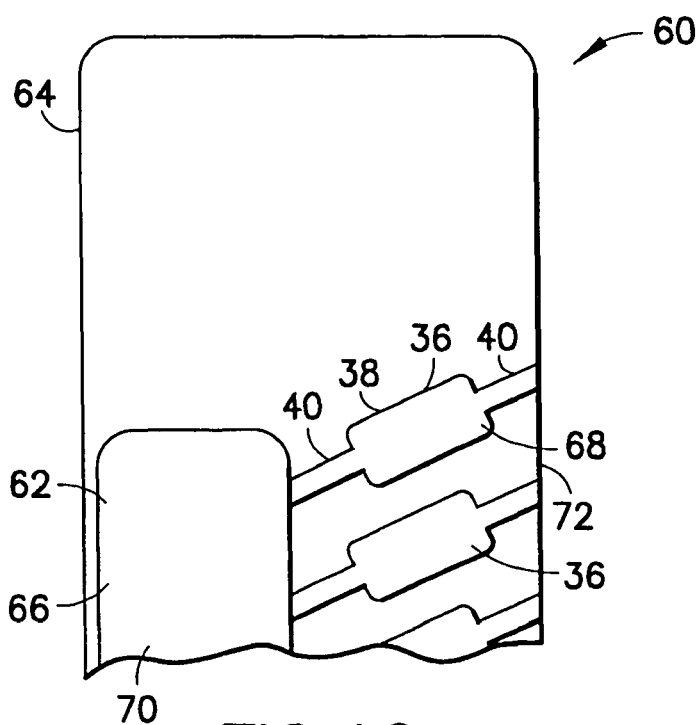
FIG. 10 is a partial rear side view as in FIG. 9 with the device in an open position.

Referring also to FIGS. 9 and 10, an alternate embodiment of the invention is shown. In this embodiment the device 60 comprises a first housing section 62 and a second housing section 64. A housing member 66 is provided which forms a portion of the first and second housing sections 62, 64. The first housing section 62 is longitudinally slidable relative to the second housing section 64 between a closed position shown in FIG. 9 and an open position shown in FIG. 10. In this embodiment the housing member 66 has a compliant hinge arrangement 68. The compliant hinge arrangement connects the first portion 70 of the housing member 66 which forms part of the first housing section 62 to the second portion 72 of the housing member 66 which forms part of the second housing section 64.

The compliant hinge arrangement 68, in this embodiment, has three beams 36 which extend from the first portion 70 to the lateral side walls of the second portion 72. The three beams 36 are grouped into one set on one lateral side of the first portion 70. However, in alternate embodiments more or less than three beams or more than one set could be provided. In addition, other shapes and sizes of compliant hinge arrangements could be provided. In this embodiment the beams 36 are identical to each other. However, in alternate embodiments, one or more of the beams could be different from the other beams. As seen in comparing FIG. 9 to FIG. 10, the beams 36 are angled downward when the telephone is in the closed, collapsed position (FIG. 9) and are angled upward when the telephone is in the open, expanded position (FIG. 10).

As noted above in the first embodiment, each beam 36 generally comprises a stiffened section 38 and two living hinge sections 40. In alternate embodiments one or more of the beams could have a uniform stiffness along its length. Thus, the beam could comprise merely one living hinge section, or could comprise more than two living hinge sections. As seen in FIGS. 9-10, the beams 36 have a general straight shape when the telephone is in the collapsed or expanded positions. However, in an alternate embodiment, one or more of the beams might not have a straight shape in the open and/or closed positions.

The embodiments described above have described use of the invention on a portion of the exterior case or housing of the portable electronic device. However, in an alternate embodiment, the miniaturized compliant sliding mechanism could be used inside the exterior case or housing of the portable electronic device. Thus, the invention does not need to part of the exterior case or housing. The structure could be placed inside the device, which could make it unseen or invisible from the outside. This location could also help the material and structure of the mechanism to be protected by the exterior cover(s) for a possible longer working life and improved reliability.

Figure 11:
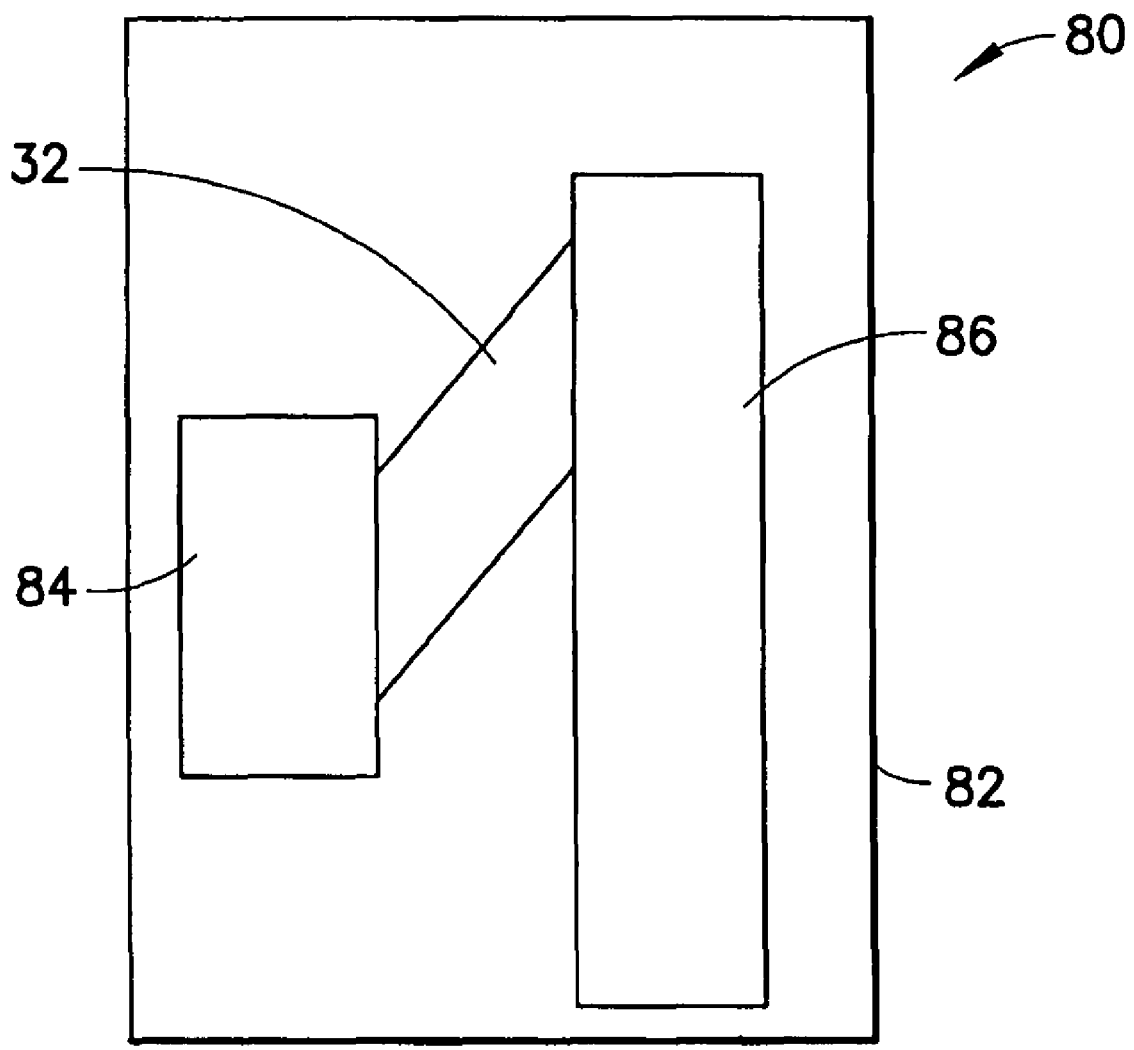
FIG. 11 is a schematic diagram illustrating another alternate embodiment of the invention.

The miniaturized compliant sliding mechanism could be used for sliding movement of any suitable members to any suitable positions; not merely between a collapsed, closed position and an expanded, open position. For example, a display or keypad could be moved between two different positions on a housing. An example of this is shown in FIG. 11. FIG. 11 shows a device 80 with an exterior cover or housing 82, two portions 84, 86 located at least partially in the housing 82, and a compliant sliding arrangement 32 connecting the portions 84, 86 to each other. The compliant sliding arrangement 32 allows the two portions 84, 86 to slide relative to each other at least partially inside the housing 82. The compliant sliding arrangement 32 is housed inside the housing 82 and not seen by the user. Of course, one or both of the portions could be a part of the exterior casing or housing 82.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
   electronic circuitry; and
   a housing having the electronic circuitry mounted therein, wherein the housing comprises a first housing section movably connected to a second housing section, wherein the housing comprises a one piece housing member having a lower section forming a portion of the first housing section, an upper section forming a portion of the second housing section, and a compliant hinge arrangement between the lower section and the upper section, wherein the compliant hinge arrangement comprises beams on opposite sides of a portion of the lower section extending to the upper section, wherein the beams comprise at least one living hinge, and wherein the first and second sections are adapted to longitudinally slide relative to each other.

2. An apparatus as in claim 1 wherein the apparatus comprises a mobile telephone and the electronic circuitry comprises a transceiver.

3. An apparatus as in claim 2 wherein the electronic circuitry in the first housing section comprises a keypad section, and wherein the electronic circuitry in the second housing section comprises a display.

4. An apparatus as in claim 1 wherein a portion of the first housing section is adapted to slide into a portion of the second housing section.

5. An apparatus as in claim 1 wherein the at least one living hinge comprises a beam with two living hinge sections.

6. An apparatus as in claim 1 wherein the upper and lower sections are adapted to move relative to each other between a collapsed position and an extended position without rotational movement therebetween.

7. An apparatus as in claim 1 wherein the first housing section is spring biased towards an extended position relative to the second housing section.

8. An apparatus as in claim 1 wherein the first and second housing sections are interlocked by a sliding rail arrangement.

9. An apparatus comprising:
electronic circuitry; and
a housing having the electronic circuitry mounted therein, wherein the housing comprises a first housing section slidably connected to a second housing section between a collapsed position and an extended position, wherein the housing comprises a one piece housing member having a lower section forming a portion of the first housing section and an upper section forming a portion of the second housing section, wherein the one piece housing member comprises a compliant hinge arrangement wherein beams on opposite sides of a portion of the lower section extend to the upper section, wherein the beams comprise at least one living hinge, and wherein the upper and lower sections are adapted to move relative to each other between the collapsed position and the extended position without rotational movement therebetween.

10. An apparatus as in claim 9 wherein the apparatus comprises a mobile telephone and the electronic circuitry comprises a transceiver.

11. An apparatus as in claim 10 wherein the electronic circuitry in the first housing section comprises a keypad section, and wherein the electronic circuitry in the second housing section comprises a display.

12. An apparatus as in claim 9 wherein a portion of the first housing section is adapted to slide into a portion of the second housing section.

13. An apparatus as in claim 9 wherein the compliant hinge arrangement comprises a beam with two living hinge sections.

14. An apparatus as in claim 9 wherein the first housing section is spring biased towards an extended position relative to the second housing section.

15. An apparatus as in claim 9 wherein the first and second housing sections are interlocked by a sliding rail arrangement.

16. An apparatus comprising a first housing section movably connected to a second housing section and a one piece housing member, wherein the one piece housing member comprises a lower section forming a portion of the first housing section, an upper section forming a portion of the second housing section, and compliant hinge arrangement, wherein the compliant hinge arrangement comprises beams on opposite sides of a portion of the lower section extending to the upper section, wherein the beams comprise at least one living hinge, wherein the first and second sections are adapted to longitudinally slide relative to each other, and wherein a portion of the first housing section is adapted to slide between portions of the second housing section.

17. An apparatus as in claim 16 wherein the at least one living hinge comprises a beam with two living hinge sections.

18. A method comprising:
providing a first section longitudinally slidably connected to a second section, wherein the first and second sections comprise electronic components of electronic circuitry of the hand-held portable electronic device; and
providing a one piece housing member having a lower section forming a portion of the first housing section, an upper section forming a portion of the second housing section, and a compliant hinge arrangement, wherein the compliant hinge arrangement comprises beams on opposite sides of a portion of the lower section extending to the upper section, wherein the beams comprise at least one living hinge, and wherein the at least one living hinge bends when the first section longitudinally slides relative to the second section.

19. A method comprising:
forming a one piece housing member with an upper section connected to a lower section by a compliant hinge arrangement;
forming a first section of the hand-held portable electronic device having electronic components of electronic circuitry therein;
forming a second section of the hand-held portable electronic device having electronic components of the electronic circuitry therein; and
longitudinally slidably connecting the first and second sections to each other, wherein the lower section of the housing member forms a portion of the first section and the upper section of the housing member forms a portion of the second section, wherein the compliant hinge arrangement comprises beams on opposite sides of a portion of the lower section extending to the upper section, and wherein the beams comprise at least one living hinge.

* * * * *